(12) United States Patent
Aykin (10) Patent No.: US 11,320,391 B2
(45) Date of Patent: May 3, 2022

(54) SYSTEM AND METHOD FOR AUTO-RANGING/AUTO-CALIBRATING UNIVERSAL ION-SELECTIVE PROBE MOBILE TECHNOLOGY INTERFACE

(71) Applicant: Bora Fadil Aykin, Keyport, NJ (US)

(72) Inventor: Bora Fadil Aykin, Keyport, NJ (US)

( * ) Notice: Subject to any disclaimer, the term of this patent is extended or adjusted under 35 U.S.C. 154(b) by 675 days.

(21) Appl. No.: 15/904,358

(22) Filed: Feb. 24, 2018

(65) Prior Publication Data
US 2019/0265184 A1 Aug. 29, 2019

(51) Int. Cl.
*G01N 27/30* (2006.01)
*G01N 27/417* (2006.01)

(52) U.S. Cl.
CPC ....... *G01N 27/302* (2013.01); *G01N 27/4175* (2013.01)

(58) Field of Classification Search
None
See application file for complete search history.

(56) References Cited

U.S. PATENT DOCUMENTS

| | | | |
|---|---|---|---|
| 8,411,050 B2* | 4/2013 | Zalewski | G06F 3/043 345/173 |
| 8,659,753 B1* | 2/2014 | Cabalo | G01N 29/2418 356/213 |
| 10,250,980 B2* | 4/2019 | Opris | H03G 3/3005 |
| 2003/0104835 A1* | 6/2003 | Douhet | H04M 1/72527 455/557 |
| 2008/0165993 A1* | 7/2008 | Cho | H04S 7/301 381/307 |
| 2016/0014530 A1* | 1/2016 | Gao | H04R 19/04 257/416 |
| 2017/0252018 A1* | 9/2017 | Wrigglesworth | A61B 10/0045 |
| 2018/0302726 A1* | 10/2018 | Koymen | B81B 7/0025 |
| 2019/0158050 A1* | 5/2019 | James | G10K 15/02 |

* cited by examiner

*Primary Examiner* — Kaveh Abrishamkar (57) ABSTRACT

A system and method for an interface reading ion-selective probes through a device with an audio input with stereo output and mono microphone inline input. Using this interface, multiple probes with different voltage ranges can be handled using one output speaker line to control offset while the other controls gain on the signal from the probe. The output from the interface is read and interpreted via the microphone bidirectional input of the device with the audio port. Furthermore, by reading the microphone input, the device with the audio port auto-calibrate and auto-range fear maximum resolution for the microphone's given dynamic range by adjusting the output fix the two speaker lines, the offset and gain.

31 Claims, 11 Drawing Sheets

FIG 1. Top level system architecture

FIG 2. Interface overview

FIG 3. Dual power supply

FIG 4. Precision rectifier 1 that transforms an AC signal from speaker wire 1 into a DC signal of proportional voltage FIG. 5. Precision rectifier 2 that transforms an AC signal from speaker wire 2 into a DC signal of proportional voltage FIG 6. Instrumentation amplifier FIG 7. Voltage controlled amplifier 1

FIG 8. Voltage controlled amplifier 2

FIG 9. Voltage adder

FIG 10. DC to AC output interface

FIG. 11. A high level flowchart for the auto-calibration and auto-ranging algorithm

SYSTEM AND METHOD FOR AUTO-RANGING/AUTO-CALIBRATING UNIVERSAL ION-SELECTIVE PROBE MOBILE TECHNOLOGY INTERFACE

FIELD OF INVENTION

The invention pertains to the field of mobile device interface systems and computer implemented methods. More specifically, the invention pertains to mobile device interface systems and computer implemented methods for ionic-selective probes.

SUMMARY OF THE INVENTION

The invention described herein relates to an interface capable of reading ion selective probes that typically produce a small DC voltage over a very large impedance (e.g. up to 1 GOhm.) Examples of these probes would be pH meters, oxidation reduction probes, sodium ion probes, chloride ion probes, heavy metal probes, and dissolved oxygen probes.

In one embodiment, the system and method of the invention comprises of (i) a device that can store and execute a series of instructions and with an audio port with an inline microphone ("computing device"), (ii) an interface device for reading the probe, and (iii) a sensor/probe.

In order to read a voltage over a very large impedance, the probe is connected to an instrumentation amplifier of the interface with a very low bias current and very high input impedance. This is necessary in order to get a voltage reading on probes that may only produce currents in the picoamp and femtoamp order of magnitude. Additionally, with a proper RC filter, instrumentation amplifiers have a great common noise rejection ratio and differential noise rejection ratio. In most modern monolithic instrumentation amplifiers, the gain is fixed with a single resistor. The system and method of the invention use a fixed gain on the instrumentation amplifier and have a variable gain step further down the line.

As in the case of a standard pH probe, the voltage produced is proportional with the logarithm of the molarity of the ion being measured. Since different types of probes produce different voltage ranges, in one embodiment, the system and method of the invention use one speaker wire of the computing device to control the offset (or y-intercept) and the other speaker wire to control the gain (or slope.) Thus, a linear transformation is made to assure that the output voltage is always positive and maximize the resolution for the given dynamic range of the microphone. This is accomplished by sending a monotone frequency through the speaker wires, using a precision rectifier for each speaker wire to end up with a DC output proportional to the amplitude of the speaker wire signals, and then using the rectified signal to act as gain control for two voltage controlled amplifiers. The first voltage controlled amplifier controls the offset voltage while the second controls gain on the signal from the instrumentation amplifier. The scaled offset and scaled output from the instrumentation amplifier are then added in a voltage adder circuit.

Finally, in order for the microphone bidirectional input to be able to read the probe, we use a chopper circuit to convert the DC signal to a waveform whose amplitude, proportional to root mean square (RMS) is linearly proportional to the linearly transformed probe voltage. Furthermore, a software running on the computing device keeps track of the RMS of the last N samples where N is a large integer. It keeps track of the standard of deviation and calculates a 95% confidence interval for the last N samples and auto-scales the gain and offset to maximize the resolution given the dynamic range of the microphone port without clipping the signal. The result is provided by the computing device to the user.

BRIEF DESCRIPTION OF THE DRAWINGS

For a more complete description of the present invention and its merits, reference should be made to the Detailed Description.

DETAILED DESCRIPTION

The Auto-Ranging/Auto-calibrating Universal Ion-Selective Probe Mobile Technology Interface is an analog hardware coupling between the small analog signal produced by low voltage high impedance ion selective probes with a software that can be run on various computing technology devices with stereo sound output and inline microphone bidirectional inputs contained by the audio (e.g. mobile phones, tablets, and computers with a 3.5 mm an audio input, etc.) This allows scientific grade ion selective probes and other DC sensors to integrate with computing platforms technology via an audio port which supports stereo output as well as inline TRRS microphone input (i.e.: 4-conductor 3.5 mm audio AUX port found on most smart phones and tablets.) The system of the present invention is capable of calibrating itself for accurate readings ("auto-calibrate") for almost all standard galvanic sensors ("sensor") for ion concentrations (e.g. probes, oxidation-reduction probes, chloride ion sensors, dissolved oxygen sensors, etc.), and determine a range ("auto-range") to maximize the precision and accuracy of readings ("reading") from a sensor for the limit of the sampling quality of the microphone input channel and prevent clipping or outputs outside the capacity of the given microphone input. It will ideally work well with well as work with any mobile computing platform (e.g. tablets, mobile phones, laptops, etc.)

Figure 1:
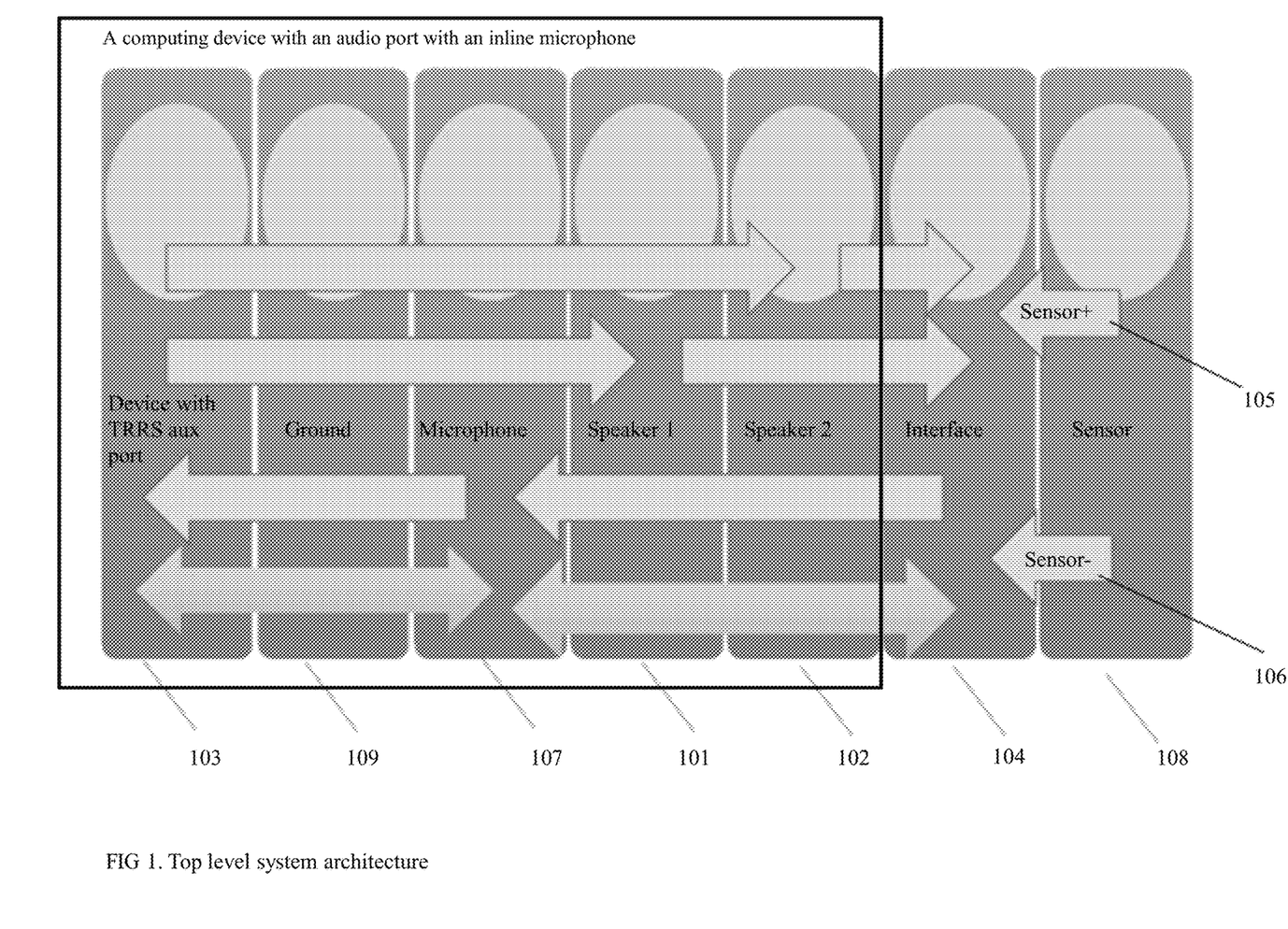
FIG. 1 depicts the overall interaction between the computing device with an audio port with an inline microphone, the interface device for reading the probe, and the sensor/probe.

FIG. 1 shows the interface and it's interaction with a computing device of the invention. A first speaker ("speaker wire 1") 101, and at least a second speaker ("speaker wire 2") 102, are outputs from the computing device 103 to the interface hardware device 104. The interface device takes the positive and negative input from the sensor, Sensor+ 105 and Sensor– 106 and outputs via the microphone input 107 a waveform which is utilized by a computing device to continuously sample and compute the reading of the sensor 108. Ground 109 for the aux port is the same ground for the interface device.

Figure 2:
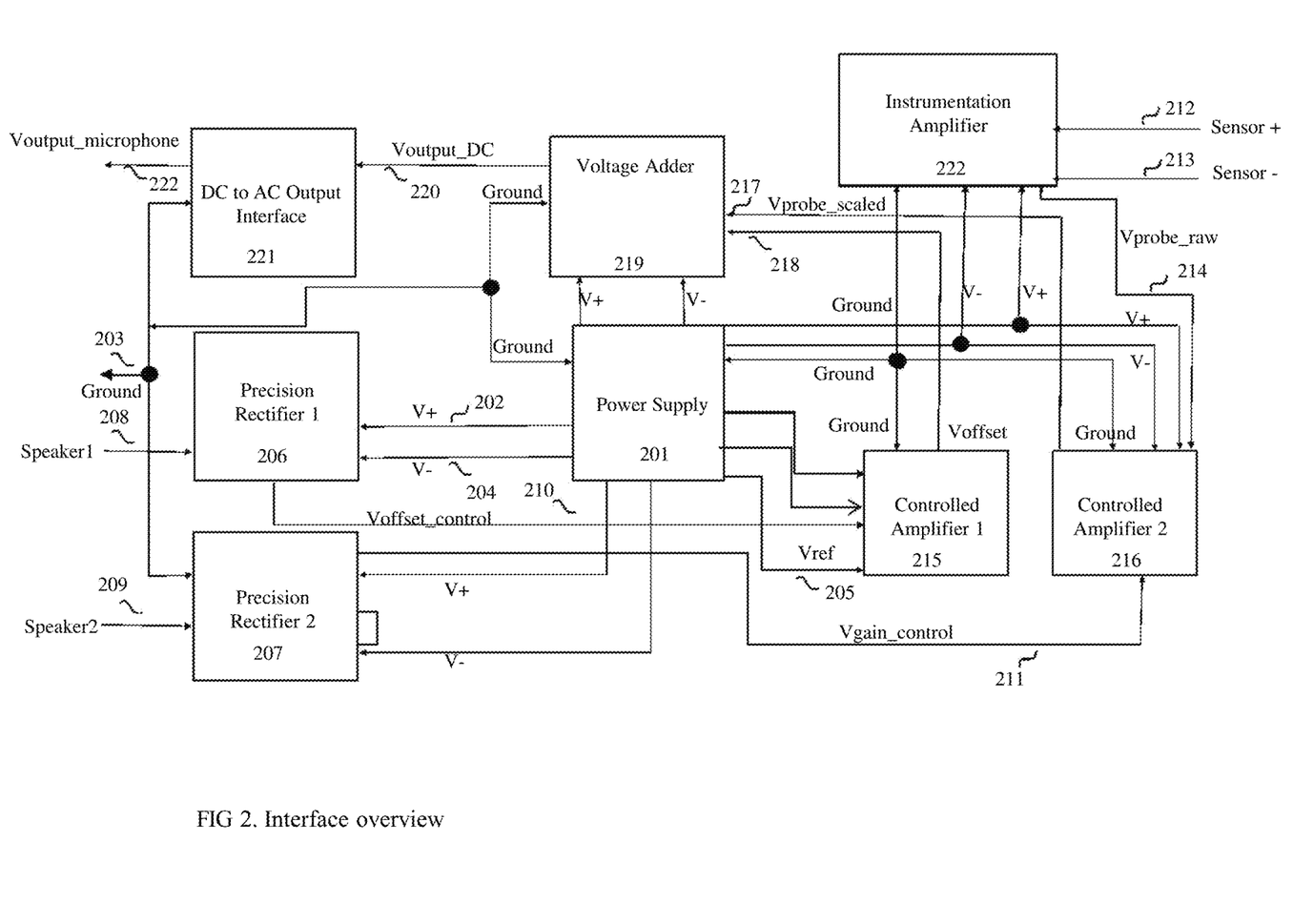
FIG. 2 shows a functional block diagram for an interface connecting the computing device with the probe.

FIG. 2 shows components of the interface device. The interface device comprises of: a power supply 201 which provides a positive V+ 202, ground 203, and negative V– 204 dual power supply as well as a secondary reference voltage Vref 205; two precision rectifiers 206 and 207 that rectify the AC signal from each speaker wire 208 and 209 and put out the offset control and gain control voltages, 210 and 211 respectively; an instrumentation amplifier module which utilizes V+, ground, and V– for its power supply and reference voltage as ground. It takes the positive 212 and negative 213 inputs from the DC sensor, and outputs Vprobe_raw 214; two voltage controlled amplifiers 215 and 216 with one taking the secondary reference voltage Vref and the other Vprobe_raw as inputs and the inputs Vgain_control and Voffset_control in order to control the gain on the probe signal and offset voltage, outputting Vprobe_scaled 217 and Voffset 218, respectively; a voltage adder 219 that takes the dual power supply and ground as well as inputs of Vprobe_scaled and Voffset and outputs the sum of the two as VoutputDC 220; and AC to DC output converter 221 that takes VoutputDC as an input and attenuates it and converts it into and AC signal within the microphones dynamic reading range and outputs it to the microphone port as Voutput_microphone 222.

Figure 3:
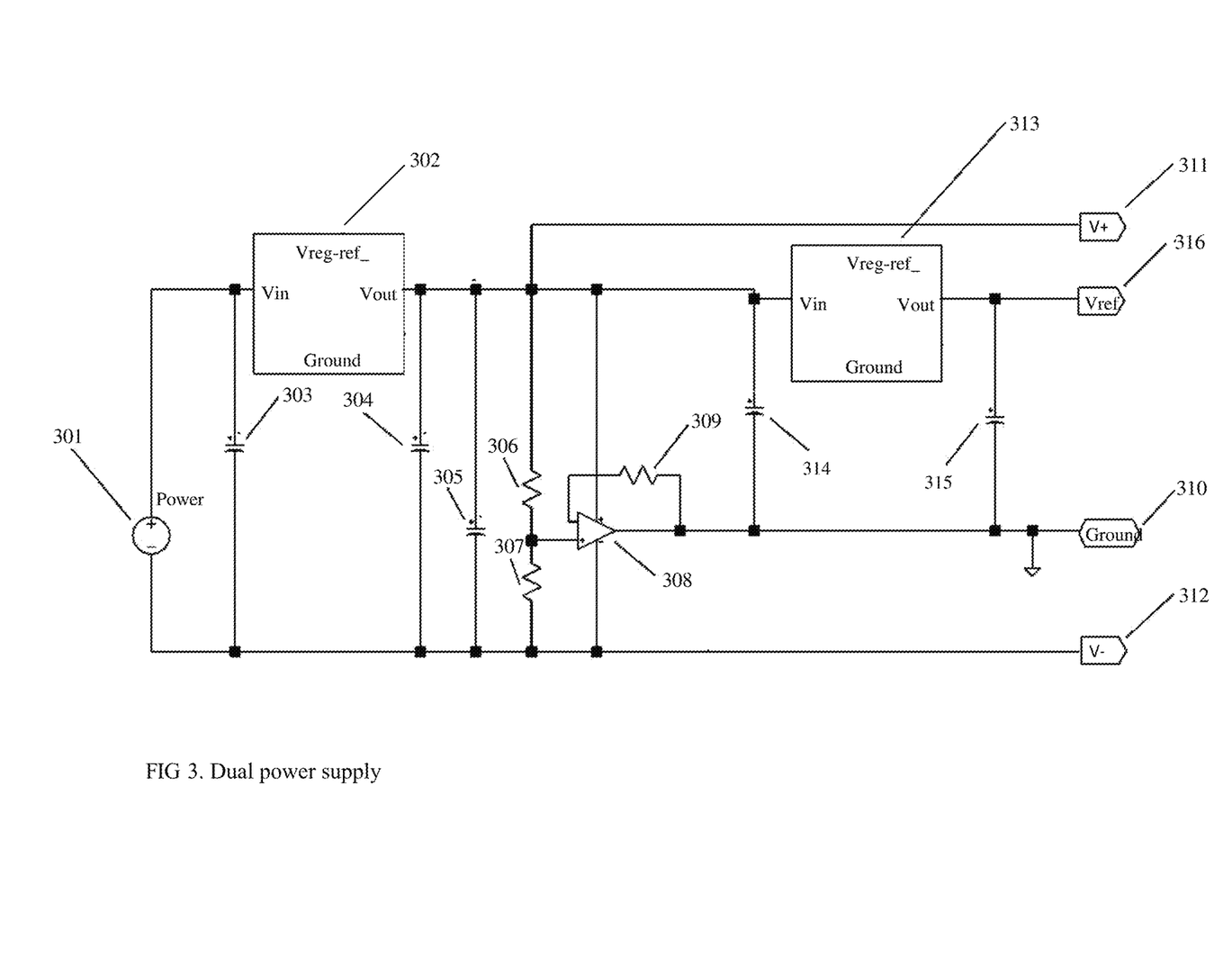
FIG. 3 shows a circuit diagram of the split power source with a secondary reference voltage as output.

FIG. 3 shows the dual power supply circuit, with a secondary reference voltage required by the interface. This consists of a rail splitter circuit that is comprised of a voltage source from a battery, Vbattery 301, a linear voltage regulator/low dropout regulator, Vreg_supply 302, with input and output filter capacitors, 303 and 304 respectively, to ensure that the supply voltage to all amplifiers remains constant and noise-free. The rail splitter further contains a large value electrolytic capacitor 305 (e.g. >=220 uF) between the output rails of Vreg_supply, two equivalent series resistors, 306 and 307, acting as a voltage divider between the rails of the voltage regulator. The junction of the two resistors is fed into the noninverting (positive) input of an operational amplifier ("op amp") 308. The positive and negative rails formed by the voltage regulator provide the positive and negative power supply for the op amp. The output of the opamp is connected in series with a small resistor, 309, back to the inverting (negative) input of the op amp in order to stabilize the rail splitter circuit from uneven loads on the positive and negative rails. The output of the op amp then serves as the ground 310 for the circuit (referred to as the circuit ground designated by the ground symbol in the rest of this patent application.) The rails from the voltage regulator are then +Vreg_supply/2 and –Vreg_supply/2 referred to as V+ 311 and V– 312 respectively. A dual power supply allows for various ion selective sensors (e.g. pH probes tend to produce negative voltages for acidic solutions and positive voltages for basic solutions.)

According to the Nernst Equation, the equation of the relationship with pH and voltage produced by a probe is:

$$E=E0+2.3(RT/F)*\log(pH+)$$

or $$E=E0-k*TY*pH$$

Where voltage is inversely related linearly with the logarithm of the concentration of hydrogen ions in a solutions. The negative log of the concentration of hydrogen ions in solution is called pH. E0 is the offset voltage of the probe and kT are the slope determined by temperature and the type of probe (Emerson Analytical, 2010).

Furthermore, in between V+ and Ground, a smaller voltage regulator/reference 313 is used with input and output filter capacitors, 314 and 315, respectively. The resulting output voltage, 316, is referred to as Vref and is referenced throughout the rest of the patent.

Figure 4:
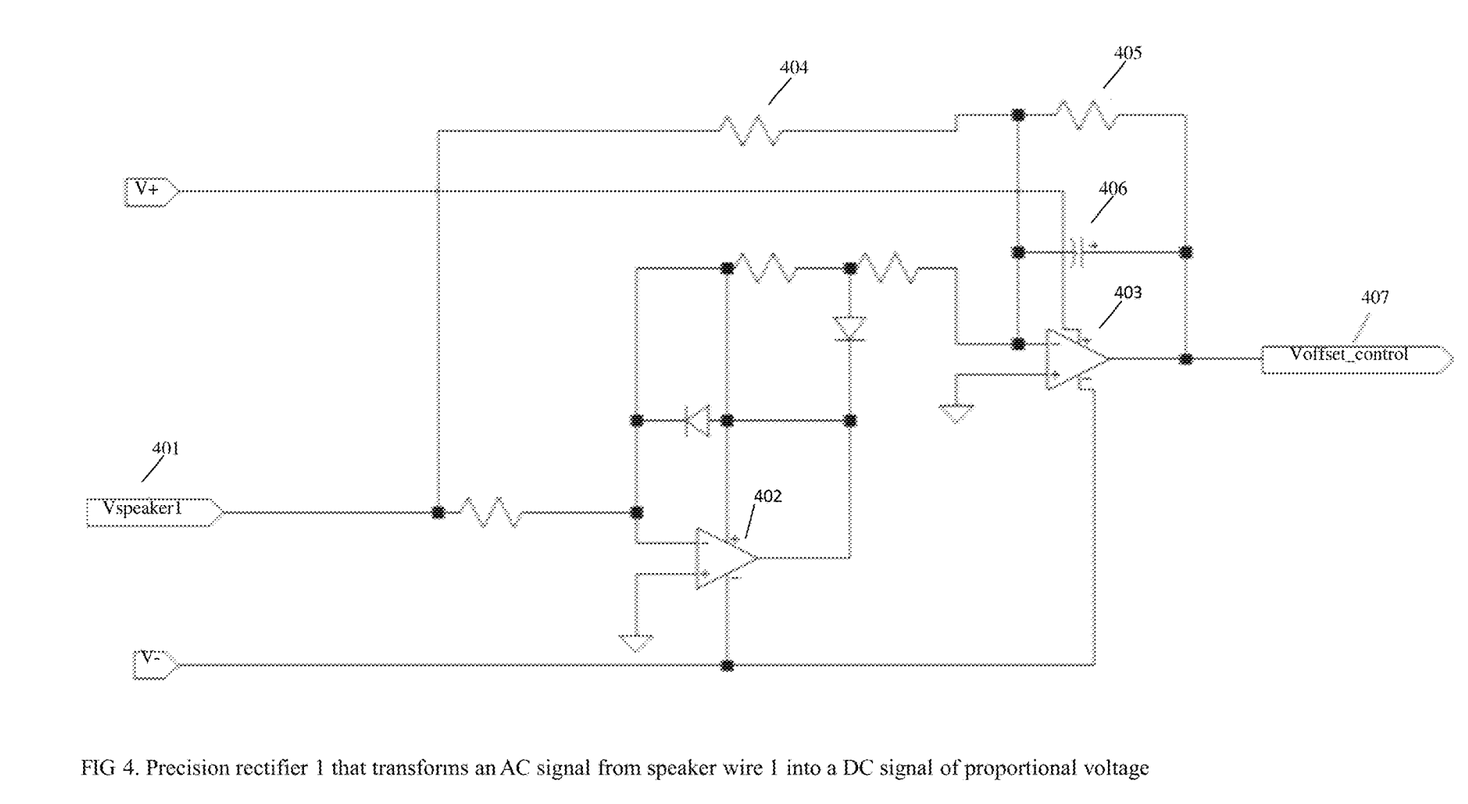
FIG. 4 shows a circuit diagram of precision rectifier 1 that transforms an AC signal from speaker wire 1 into a DC signal of proportional voltage.

The circuit diagram for precision rectifier 1 is shown in FIG. 4. The control of gain on the signal from the probe is accomplished by the software playing a monotone frequency through either the left or right speaker wire 1 401. The voltage output from speaker wires can only be of alternating current. It is necessary for the AC signal from the speaker wires to be transformed into a DC voltage. Furthermore, since most computing devices' audio have a maximum AC output with an RMS under 0.7V, a precision rectifier circuit rather than a standard fill bridge is used. This is accomplished by running the voltage from speaker wire 1 through the precision rectifier as shown in FIG. 4. The operational amplifiers 402 and 403 use the supply voltages V+ and V– from the split power supply as well as the ground. The gain is set by the proportion of the resistor 404 to resistor 405 for the second op amp in the half bridge rectifier using op amp 403. The other half is bypassed and rectified as well using op amp 403 as the other half bridge rectifier. The capacitor 406 acts as a smoothing capacitor using a relatively large value capacitor to smooth the rectified signal into a nearly flat DC signal. The processed voltage from speaker wire 1 output of op amp 403 is referred to as Voffset_control 407. Voffset_control controls the offset voltage for processing the main raw signal from the probe similar to the y-intercept if x is the raw voltage from the sensor and f(x)=m x+b is the linear relation between raw voltage and scaled probe voltage. Since the voltage is relatively small (<0.7 V), the rectified signal must be amplified.

Figure 5:
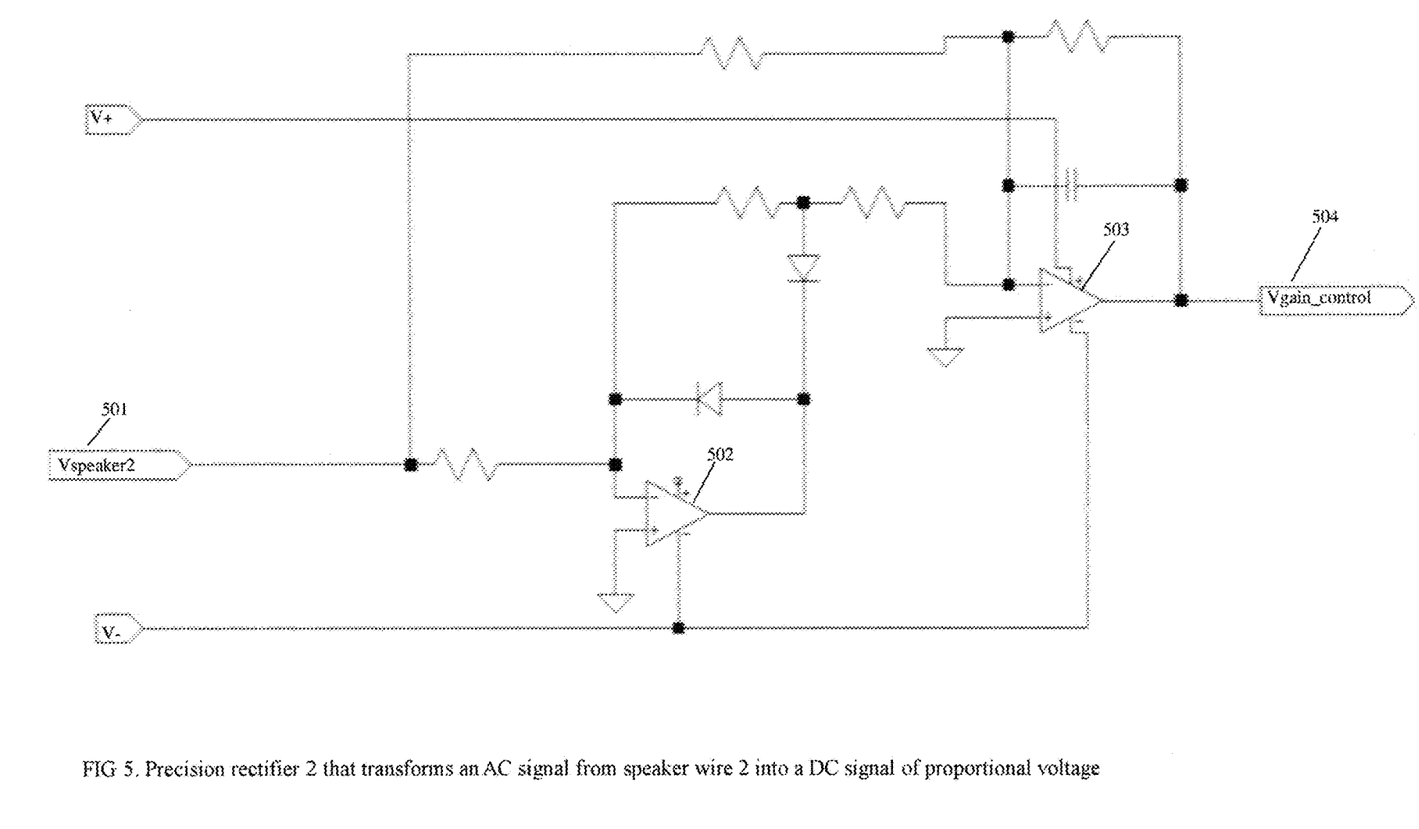
FIG. 5 shows a circuit diagram of precision rectifier 2 that transforms an AC signal from speaker wire 2 and converts it into a DC signal of proportional amplitude.

Precision rectifier 2 has a circuit diagram depicted in FIG. 5. To determine the gain on the probe, the software plays a monotone frequency of a certain amplitude from speaker wire 2 501. This signal is run through a separate precision rectifier consisting of two op_amps 502 and 503, identical to the one used for speaker wire 1 in FIG. 4. The DC output of the second rectifier circuit is referred to as Vgain_control 504. Although similar in turning a strictly AC signal into a DC signal that has been amplified, Vgain_control serves a particular function in that if f(x), the scaled voltage, is linear with the raw probe, then f(x)=y=m x+b, where m is controlled by Vgain_control.

Figure 6:
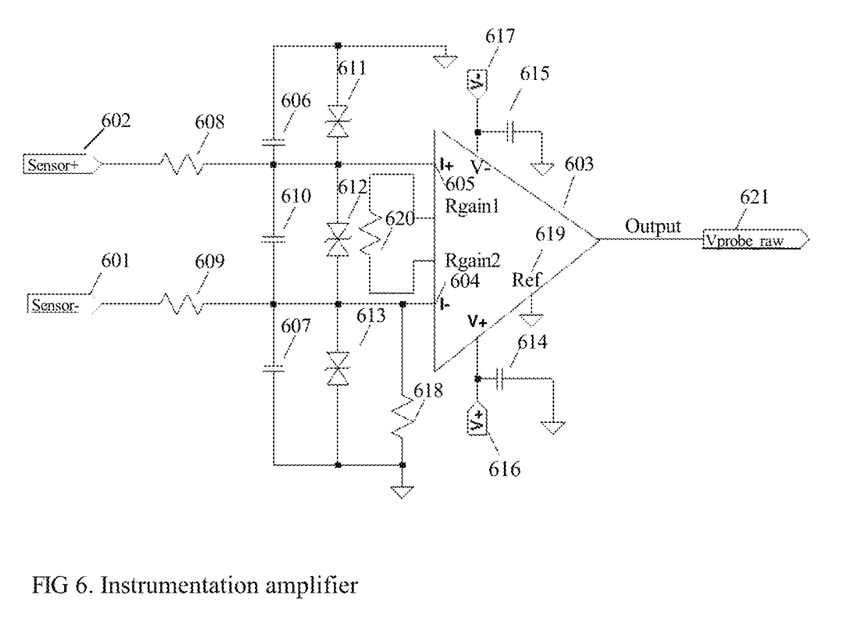
FIG. 6 shows an instrumentation amplifier with an RC filter and overvoltage protection with inputs from a sensor/probe that outputs the amplified signal with a fixed gain.

FIG. 6 depicts the instrumentation amplifier interface which takes the negative Sensor− 601 and positive Sensor+ 602 inputs as the instrumentation amplifier 603's negative 604 and positive 605 signal inputs respectively. The capacitors, 606 and 607, and the resistors 608 and 609, are matched as evenly as possible as a low pass filter on the positive and negative inputs of the instrumentation amplifier. The third capacitor 610 has a capacitance of an order of magnitude larger than the 606 and 607 value. Capacitors 606 and 607 provide a common mode high frequency filter while 610 serves as a differential frequency filter. This is to prevent noise of high frequencies from being converted to a common mode DC error (Planet Analog, 2007). Furthermore, transient voltage suppressor (TVS) diodes 611, 612, and 613 serve as an antistatic filter to protect the instrumentation amplifier's inputs from electro-static discharge that could damage the amplifier. Capacitors 614 and 615 are used as filters for the positive V+ 616 and negative V− 617 supply inputs, respectively, for the instrumentation amplifier. The negative sensor input of the instrumentation amplifier is connected to ground through a small resistance resistor 618 to provide a return path for input bias current to prevent floating inputs from being saturated (Kitchin and Counts, 2015).

Since ion-selective electrodes produce relatively small voltages and have very large impedances, an instrumentation amplifier with an extremely low bias current (picoamperes or preferably femtoamperes) and large input impedance is required to read the voltage of the probe accurately.

The positive and negative supply inputs are connected to V+ and V− respectively. The reference pin 619 is connected to ground. The pins to set the gain, G− and G+ have a fixed resistor, Rgain 620, to set the gain of the amplifier. The output is the probe voltage multiplied by the fixed gain which is inversely related with by Rgain. This is referred to as Vprobe_raw 621.

Figure 7:
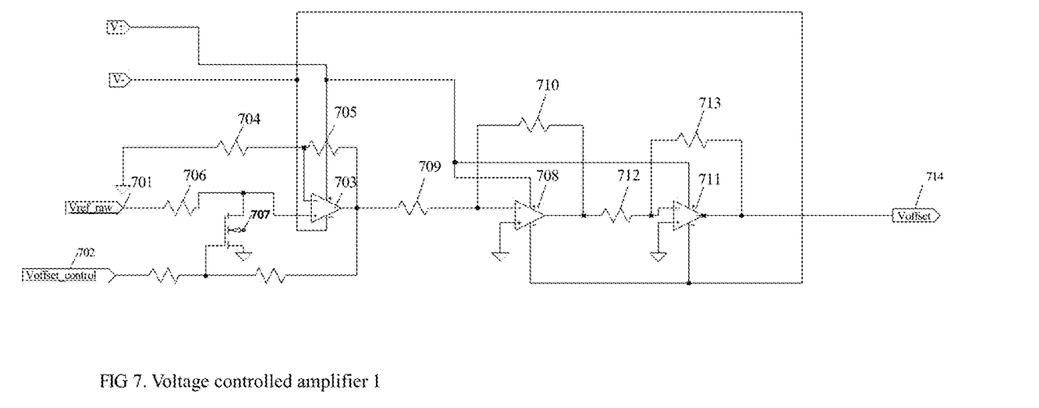
FIG. 7 shows voltage controlled amplifier 1 that controls the offset voltage using the reference voltage from the power supply in FIG. 3 as an input and the DC output from precision rectifier 1 depicted in FIG. 4 as a control on the gain of the amplifier. It outputs a scaled offset inversely proportional with the amplitude of the signal on speaker wire 1.

FIG. 7 shows a voltage controlled amplifier circuit where Vref 701 is the signal voltage and Voffset_control 702 acts as a control on the gain of op amp 703. This is accomplished by connecting ground to negative input of op amp 703 through resistor 704 with an equivalent resistor 705 as the bypass/gain resistor ensuring a gain of 1 on the inverting input of the op amp 703. The reference voltage from the power supply module, Vref, is fed through terminal Vref_raw and is connected by a resistor 706 to the noninverting unit of op amp 703. Between Vref_raw and the noninverting input is a path through MOSFET 707 leading to ground. The gate of the MOSFET is controlled by Voffset_control 702 thereby controlling the amount of gain on the Vref_raw signal in op amp 703. The output of op amp 703 is led to an attenuator composed of op amp 708 and resistors 709 and 710 outputting the inverted attenuated signal. The third op amp 711 has a fixed gain of one with equivalent resistors 712 and 713. The output of this entire voltage controlled amplifier module is referred to as Voffset 714. All three amplifiers use V+ and V−. This way the offset can be controlled via speaker wire 1.

Figure 8:
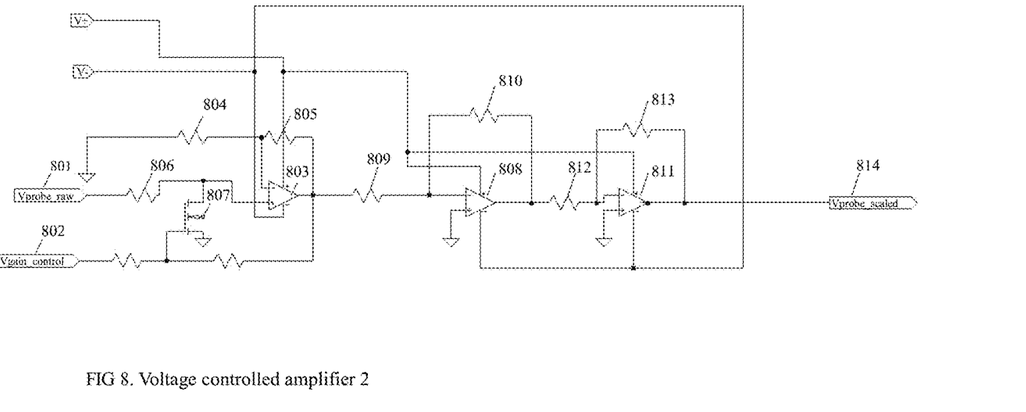
FIG. 8 shows voltage controlled amplifier 2 that controls the gain on the probe signal using the output from the instrumentation amplifier interface as an input and the DC output from precision rectifier 2 depicted in FIG. 5 as a control on the gain of the amplifier. It outputs a scaled probe signal inversely proportional with the amplitude of the signal on speaker wire 2.

FIG. 8 shows a Voltage controlled amplifier that controls the gain on the probe signal. It accomplishes this by taking Vprobe_raw 801 as an input signal and Vgain_control 802 as the gain control. Thus, with speaker wire 2, the probe voltage is scaled as output Vprobe_scaled 803. This is the mechanism in which the gain and offset or slope and y intercept are controlled for scaling the probes signal for the dynamic range of the microphone. This is accomplished by connecting ground to negative input of op amp 803 through resistor 804 with an equivalent resistor 805 as the bypass/gain resistor ensuring a gain of 1 on the inverting input of the op amp 803. The raw probe signal from the instrumentation amplifier interface is connected by a resistor 806 to the non-inverting unit of op amp 803. Between Vprobe_raw and the non-inverting input is a path through MOSFET 807 leading to ground. The gate of the MOSFET is controlled by Vgain_control 802 thereby controlling the amount of gain on the Vprobe_raw signal in op amp 803. The output of op amp 803 is led to an attenuator composed of op amp 808 and resistors 809 and 810 outputting the inverted attenuated signal. The third op amp 811 has a fixed gain of one with equivalent resistors 812 and 813. The output of this whole voltage controlled amplifier module is referred to as Vprobe_scaled 814. All three amplifiers use V+ and V−.

Figure 9:
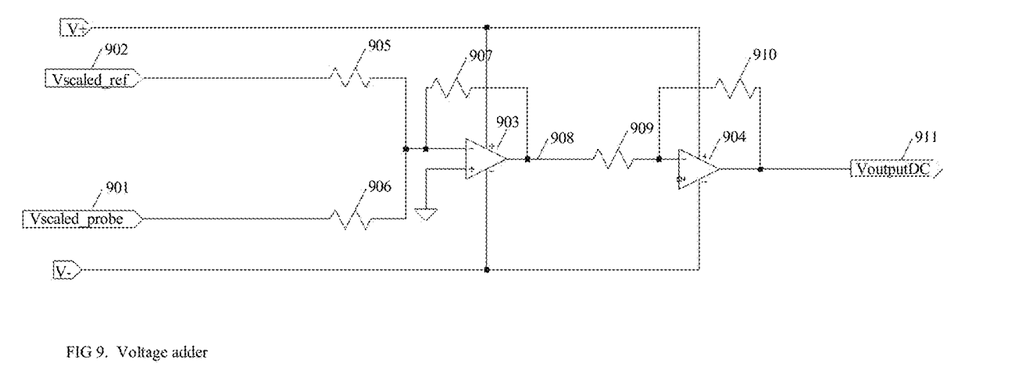
FIG. 9 shows a voltage adder circuit taking the scaled probe voltage and scaled offset voltage as inputs and outputting the sum of the voltages.

FIG. 9 depicts the voltage adder circuit. Vprobe_scaled 901 and Voffset 902 are added in a voltage adder circuit consisting of two opamps, opamp 1 903 and opamp 2 904. Given that resistors 905, 906, and 907 have equivalent resistance values, opamp 1 903 takes Vprobe_scaled 901 and Voffset 902 as inputs in parallel to its inverting input and outputs the negative of the sum of Vprobe_scaled and Voffset at its output 908. Given that R4 909 and R5 910 have equivalent resistances, opamp 2 904 inverts the output of opamp 1, outputting the sum of Vprobe_scaled and Voffset as VoutputDC 911. Therefore, the software controls the scaling of the DC voltage output from this step, referred to as VoutputDC. Both op_amps utilize the dual power supply outputs as inputs V+, V−, and Ground.

$$VoutputDC = (gain1 * Vsr) + (gain2 * Vref)$$

Figure 10:
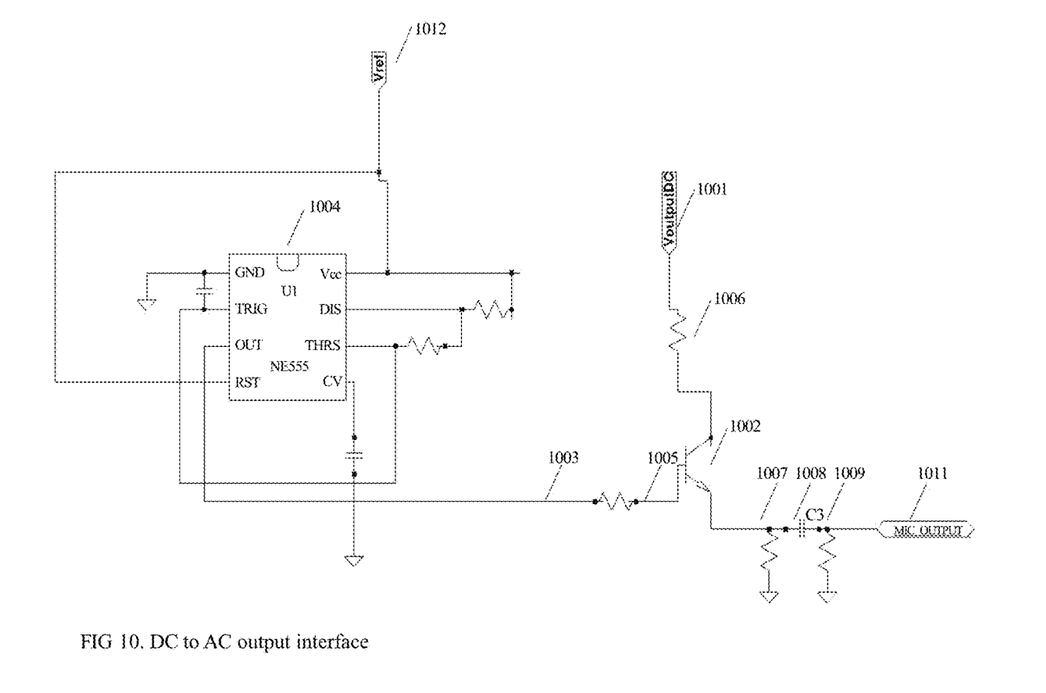
FIG. 10 shows a chopper circuit that converts the DC output from the voltage adder in FIG. 9 into an AC signal while attenuating it. Finally, the AC signal is outputted to a capacitively coupled microphone bidirectional output allowing the AC signal output to pass while blocking the microphone DC bias current from traveling in the reverse direction.

FIG. 10 depicts the DC to AC output interface that converts the DC signal to an AC waveform with a proportional amplitude. Finally, the DC voltage that has been linearly transformed, VoutputDC 1001, run through a transistor 1002 with a gate connected to a timer output 1003 (e.g. 555 timer) from the timer 1004. This transforms the DC signal from the output of the voltage adder to a square pulse waveform with an amplitude equal to the DC voltage, Vsquare 1005. The square waveform runs through a resistor based voltage divider consisting of 1006 and 1007 and resistor-capacitor ("RC") integrator circuit consisting of coupling capacitors Ccoupling 1008 and Rcoupling 1009. This transforms the square pulse wave into a saw tooth waveform, outputted at MIC_OUTPUT 1011. The RC sub circuit acts as an AC coupling preventing the microphone bias voltage from entering the interface while allowing the saw tooth waveform to pass to the microphone output 1011. This circuit utilizes Vref 1012 from the power supply to power the timer circuit and ground 1013 from the power supply which is common with audio_ground.

Figure 11:
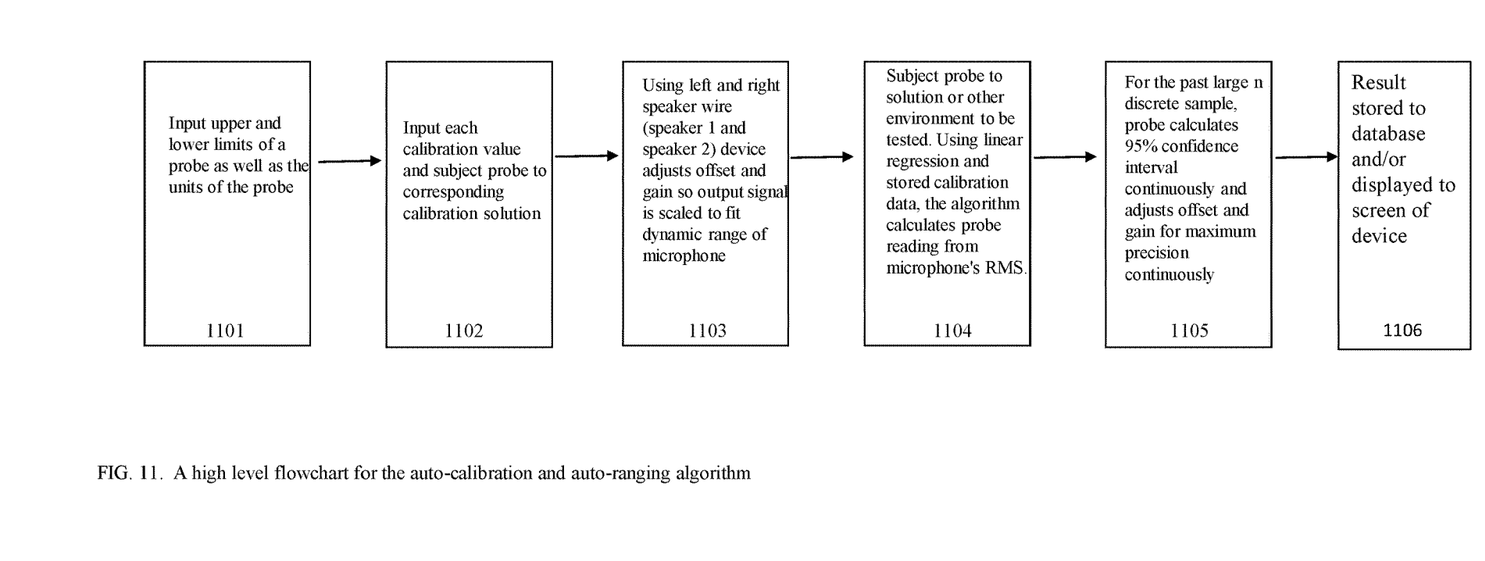
FIG. 11 shows a high level flowchart for the auto-calibration and auto-ranging algorithm.

The mobile technology employs a software interface depicted in FIG. 11. The software interface calculates the root mean square (RMS) on the wave form being read as the input 1003. In the case of the SQUARE waveform, the RMS is linearly correlated with the amplitude of the waveform. Therefore, as long as the probe is calibrated 1102 using the appropriate calibration solutions, the linear relation between the output RMS and the logarithm of the concentration of ions being measured can be used to calculate the concentration of the voltage of the probe and thus the pH concentration of ions/molecules, temperature, etc.

For the initial calibration, the user specifies the units of the probe, the upper and lower limits, and inserts the probe into the probe manufacturer's calibration solutions 1102.

The software takes RMS readings by taking the sum of squares of discrete samples of the microphones linear PCM readings.

For the given upper and lower bounds and discrete samples for which RMS has been calculated, the software of the invention use regression to calculate the correlation between the RMS and probe reading. The software adjusts to "scale to fit" the RMS for the microphone port's range of amplitude by varying the offset and gain 1103. This is the key feature that allows the system of the invention to be used with a large variety of sensors 1103.

Furthermore, for auto-ranging, the standard deviation and mean of the discrete samples of linear PCM data from the microphone are calculated by the software of the invention. Using the standard deviation and mean, a 95% confidence interval established. Using this range, the software auto range for even greater precision 1104. This is accomplished again by varying the gain and offset via the speaker wires 1105. The result is then displayed to the screen and/or recorded to a database 1106.

The interface system and computer method of the present invention are described herein as part of the preferred embodiment. However, the examples and descriptions provided are only for illustration purpose and do not restrict in any way the scope and the applications of the interface system or use of computer method of the invention in other settings.

The invention claimed is:

1. A computer implemented system comprising of:
   i. a mobile device with an audio port consisting of left and right speaker outputs, an input line, and a common ground;
   ii. software on the mobile device capable of reading the root mean square (RMS) of the microphone line voltage and outputting in dependent variable amplitude monotone frequencies through the left and right speaker wires;
   iii. a DC galvanic sensor probe;
   iv. a hardware interface between the mobile device and the DC galvanic sensor probe that converts the DC signal from a galvanic sensor probe into an AC signal that can be read by the microphone input.

2. The system of claim 1 wherein the hardware interface accepts the two speaker outputs of the mobile device's audio port as inputs.

3. The system of claim 1, wherein the hardware interface has a single output through the microphone input of the mobile device's audio port.

4. The system of claim 1, wherein the hardware interface shares a ground with the mobile device's audio port ground.

5. The system of claim 1, wherein the hardware interface accepts a DC sensor or an ion-selective electrode.

6. The system of claim 1, wherein the hardware interface comprises:
   a dual power supply, a dual precision rectifier circuit, a dual voltage controlled amplifier, an instrumentation amplifier, a voltage adder circuit, a timer connected to a transistor, and a capacitive coupling with the microphone input.

7. The system of claim 6, wherein each precision rectifier takes a one of the two speaker output signals generated by the mobile device's software from claim 1: i. the left speaker wire produces a monotone frequency which is rectified into a DC signal for gain control, referred to as Voffset_control; ii. the right speaker wire produces a monotone frequency which is rectified to be a DC signal for offset control, referred to as Vgain_control.

8. The system of claim 6, wherein the dual power supply regulates a single power source to maintain a constant supply voltage.

9. The system of claim 8, wherein the dual power supply splits the regulated voltage into a positive and negative DC voltage with half the voltage of the original regulated voltage, providing a ground connected to the ground of the audio port.

10. The system of claim 9, wherein a secondary voltage reference is provided with a fixed voltage regulator between the positive power supply and ground from the rail splitter circuit, referred to as Vref.

11. The system of claim 6, wherein the instrumentation amplifier takes a positive and negative input from the DC galvanic sensor probe and is DC coupled with an RC circuit to filter higher frequencies out.

12. The system of claim 9, wherein the instrumentation amplifier takes a positive and negative rails (V+ and V−) from the dual power supply and the circuit ground as a reference input.

13. The system of claim 12, wherein the negative input of the instrumentation amplifier is connected via a small resistor to its reference providing a return path for the bias current.

14. The system of claim 6, wherein the instrumentation amplifier's gain is fixed by a single resistor across the gain pins.

15. The system of claim 10, wherein the output Vref of the power supply is the input of a first voltage controlled amplifier.

16. The system of claim 9, wherein Voffset_control and Vref are the inputs to a first voltage controlled amplifier.

17. The system of claim 14, wherein the first voltage controlled amplifier uses Voffset_control to control the gate of a MOSFET that leads to ground from Vref, with Voffset_control being inversely related to the gain on Vref.

18. The system of claim 15, wherein the second voltage controlled amplifier takes the raw reference voltage, Vref, and outputs the scaled voltage, Voffset with a gain inversely related to Voffset_control.

19. The system of claim 6, wherein the output of the instrumentation amplifier is the input of the second voltage controlled amplifier, referred to as Vprobe_raw.

20. The system of claim 9, wherein Vgain_control and Vprobe_raw are inputs to the second voltage controlled amplifier.

21. The system of claim 20, wherein the second voltage controlled amplifier uses Vgain_control to control the gate of a MOSFET that leads to ground from Vprobe_raw, with Vgain_control being inversely related to the gain on Vprobe_raw.

22. The system of claim 20, wherein the second voltage controlled amplifier takes the raw DC galvanic sensor probe voltage, Vprobe_raw, and outputs the scaled voltage, Vprobe_scaled with a gain inversely related to Vgain_control.

23. The system of claim 1, wherein the voltage adder consists of two operational amplifiers (op amps) and five resistors.

24. The system of claim 18, wherein op amp 1 of the voltage adder sums the Vscaled_probe (scaled signal) and Voffset, and outputs the inverse of the sum through the inverting input given that R1 R2 R3 are equivalent;
   op amp 2 takes the output of op amp 1 as it's inverting input; and
   op amp 2 outputs the non-inverted sum of Vscaled_probe and Voffset as Voutput_DC.

25. The system of claim 1, wherein the interface contains a module to attenuate the DC voltage Voutput_DC and convert it first to a square wave then to a saw tooth wave via an oscillator, transistor, voltage divider, and IRE coupling to the microphone bias bidirectional port of the audio receptacle.

26. The system of claim 25, wherein Voutput_DC is run through a series connection of a larger resistor R1, a transistor, and a small resistor to ground R2, which is common with both the ground of the power supply and audio port.

27. The system of claim 25, wherein the timer output is connected to the gate of the transistor and the frequency is set to the mid-range of the audio spectrum.

28. The system of claim 25, wherein the voltage across R2 is a square pulse wave with an amplitude proportional to the amplitude of the DC signal Voutput_DC, known as Vsquare.

29. The system claim 28, wherein the coupling capacitor and R3 provide the functions of:
  i. blocking bias current from the bidirectional microphone port used to power plug and play microphone devices from back-flowing into the circuit; and
  ii. acting as an RC integrator to transform the square wave into a saw tooth wave.

30. The system of claim 29, wherein the saw tooth wave, referred to as Voutput_microphone read by the driver software by calculating the root mean square (RMS) for discrete samples of the amplitude in linear PCM and therefore its amplitude.

31. The system of claim 30, wherein the RMS is used for:
  i. initially calibrating using the manufacturer's upper and lower bounds for the DC galvanic sensor probe and using simple linear regression to empirically construct the formula for RMS versus measurement of the DC galvanic sensor probe;
  ii. scaling the RMS to fit the microphone port's dynamic range by varying the offset and gain by varying the respective speaker wires allowing it to handle most ionic selective DC galvanic sensor probes even though voltage ranges are vastly different for different sensor types; and
  iii. taking discrete samples and adjusting the offset and gain for further precision.

* * * * *